US010147116B2

(12) United States Patent
Ikonen

(10) Patent No.: US 10,147,116 B2
(45) Date of Patent: Dec. 4, 2018

(54) CONTENT TRACKING

(75) Inventor: Teemu Aaron Ikonen, Espoo (FI)

(73) Assignee: Mavenir Systems, OY, Espoo (FI)

( * ) Notice: Subject to any disclaimer, the term of this patent is extended or adjusted under 35 U.S.C. 154(b) by 443 days.

(21) Appl. No.: 12/668,707

(22) PCT Filed: Jul. 16, 2008

(86) PCT No.: PCT/FI2008/050431
§ 371 (c)(1),
(2), (4) Date: Jan. 12, 2010

(87) PCT Pub. No.: WO2009/010634
PCT Pub. Date: Jan. 22, 2009

(65) Prior Publication Data
US 2010/0185767 A1 Jul. 22, 2010

(30) Foreign Application Priority Data
Jul. 17, 2007 (FI) ...................... 20075549

(51) Int. Cl.
H04L 12/58 (2006.01)
H04L 29/08 (2006.01)
G06Q 30/02 (2012.01)

(52) U.S. Cl.
CPC ......... *G06Q 30/0251* (2013.01); *G06Q 30/02* (2013.01); *G06Q 30/0271* (2013.01); *H04L 51/34* (2013.01); *H04L 67/22* (2013.01); *H04L 51/38* (2013.01); *H04L 67/06* (2013.01); *H04L 67/20* (2013.01)

(58) Field of Classification Search
CPC ............ G06Q 30/0251; G06Q 30/0271; H04L 51/34; H04L 67/22; H04L 67/20

USPC ........................................................ 709/226
See application file for complete search history.

(56) References Cited

U.S. PATENT DOCUMENTS

| 5,893,077 A | 4/1999 | Griffin |
| 5,937,345 A | 8/1999 | McGowan et al. |
| 6,195,543 B1 | 2/2001 | Granberg |

(Continued)

FOREIGN PATENT DOCUMENTS

| WO | 2002/076077 A1 | 9/2002 |
| WO | WO 03/063023 A2 | 7/2003 |

(Continued)

OTHER PUBLICATIONS

International Search Report in parent application No. PCT/FI2008/050431.

(Continued)

*Primary Examiner* — Emmanuel L Moise
*Assistant Examiner* — Xiang Yu
(74) *Attorney, Agent, or Firm* — Ohlandt, Greeley, Ruggiero & Perle, L.L.P.

(57) ABSTRACT

Disclosed is a method and a tracking system for tracking content in a mobile communication network. The method comprises maintaining predefined identifying information pertaining to content to be tracked, the identifying information being independent of user information associated with the content, intercepting a message originated from a user, comparing content of the message with said predefined identifying information, and responsive to obtaining at least partial match in said comparing, concluding that said message comprises content to be tracked.

10 Claims, 5 Drawing Sheets

(56) References Cited

U.S. PATENT DOCUMENTS

| | | |
|---|---|---|
| 2002/0194062 A1 | 12/2002 | Linde |
| 2003/0212745 A1 | 11/2003 | Caughey |
| 2003/0217139 A1 | 11/2003 | Burbeck et al. |
| 2004/0117451 A1 | 6/2004 | Chung |
| 2004/0141354 A1* | 7/2004 | Carnahan .......... G06F 17/30864 365/145 |
| 2004/0255025 A1 | 12/2004 | Ricagni |
| 2005/0014483 A1 | 1/2005 | Lagerstrom |
| 2005/0091367 A1* | 4/2005 | Pyhalammi et al. ......... 709/224 |
| 2005/0108340 A1* | 5/2005 | Gleeson et al. ............. 709/206 |
| 2005/0144065 A1* | 6/2005 | Calabria ................ G06Q 30/02 705/14.68 |
| 2007/0088851 A1 | 4/2007 | Levkovitz et al. |
| 2007/0088852 A1* | 4/2007 | Levkovitz ........... H04L 12/1859 709/246 |
| 2007/0107059 A1* | 5/2007 | Chasin ................. H04L 63/126 726/23 |
| 2007/0150606 A1 | 6/2007 | Flinchem et al. |
| 2007/0157227 A1 | 6/2007 | Carpenter et al. |
| 2007/0191040 A1 | 8/2007 | Kadar et al. |
| 2008/0227385 A1* | 9/2008 | Bappu .................. H04L 12/189 455/3.06 |
| 2008/0228575 A1* | 9/2008 | Silberstein ............ G06Q 30/02 705/14.47 |
| 2008/0279113 A1 | 11/2008 | Kaliolla |
| 2009/0068991 A1* | 3/2009 | Aaltonen ............... G06Q 30/02 455/412.1 |
| 2010/0268585 A1* | 10/2010 | Padveen et al. ........... 705/14.16 |

FOREIGN PATENT DOCUMENTS

| | | |
|---|---|---|
| WO | 2007/012118 A1 | 2/2007 |
| WO | 2007/014047 A1 | 2/2007 |
| WO | WO2007/015228 A1 | 2/2007 |
| WO | 2009/010636 A1 | 1/2009 |

OTHER PUBLICATIONS

3 GPSS TS 23.140 v6.9.0.
Joosse, K, "Watermarking and fingerprinting: key technologies for video identification", Internet Citation: XP002266171 Nov. 4, 2002.
Examination Report Notification under article 94 (3) dated Oct. 10, 2017 from corresponding EP Application No. 08 175 541.9, 6 pages.

* cited by examiner

CONTENT TRACKING

FIELD OF THE INVENTION

The present invention generally relates to content tracking in mobile communication networks. The invention relates particularly, though not exclusively, to tracking of advertising content.

BACKGROUND OF THE INVENTION

There are currently various efforts ongoing in relation to advertising in mobile communication systems. For an advertiser it is advantageous to be able to follow up user response to the advertising content provided to the users, i.e. behaviour of the recipients after they have received some advertising content. One way to follow up the user response to digital advertising content is to track clickbacks on advertisement banners, tags or the like. This is commonly used in Internet advertising systems. Sometimes people however forward advertisements they received in a message (be it email, SMS, MMS, or some other message) to someone else. For this reason simple follow up of clickbacks results in that the advertiser may not know from where the user received the advertisement and therefore may not be able to optimally use the clickback information in adjustment user segmentation. That is, the advertiser may not know identity of the original recipient of the advertisement. As Internet is based on anonymity it is difficult to solve this problem in Internet environment. In mobile communication networks the network operator knows identities of the users whereby new opportunities arise for solving this problem.

In other words, in a mobile advertising system the network operators (possibly acting as an advertisement aggregator) have the added benefit that they know identities of individual users receiving the advertising content. Hence, the advertising content delivered to a particular recipient can be tracked, user reaction to it can be logged as well as the eventual forwarding of such content to other users can be monitored and acted upon. In currently known systems such tracking is based on maintaining mappings between recipients of certain content and the actual content. This type of tracking may be referred to as Superdistribution. For example OMA (Open Mobile Alliance) DRM 2 (Digital Rights Management) defines a complex set of tokens to be used for maintaining such mappings, which can then be used for tracking whether certain recipient of content forwards the content to someone else. Also other systems that are based on maintaining similar mappings exist.

SUMMARY

Now an alternative solution for tracking content is provided.

According to a first aspect of the invention there is provided a method for tracking content in a mobile communication network, the method comprising maintaining predefined identifying information pertaining to content to be tracked, the identifying information being independent of user information associated with the content, intercepting a message originated from a user, comparing content of said message with said predefined identifying information, and responsive to obtaining at least partial match in said comparing, concluding that said message comprises content to be tracked.

In an embodiment of the invention the method further comprises distributing content to one or more recipients, storing identifying information pertaining to said distributed content, and using said stored identifying information as said predefined identifying information.

Still further the method may comprise responsive to not obtaining a match in said comparing, storing identifying information pertaining to the content of the message.

In another embodiment of the invention the method further comprises responsive to concluding that said message comprises the content to be tracked, extracting from said message user information pertaining to the sender and/or receiver of the message, and using said user information for updating one or more user profiles.

In yet another embodiment of the invention the content to be tracked is advertising content and the method further comprises responsive to concluding that said message comprises the content to be tracked, attaching into said message additional advertising content that suits the content to be tracked.

The identifying information may comprise for example one or more of the following: text length, a string indicating word lengths, a watermark, metadata, a checksum, and a full copy of the content to be tracked.

According to a second aspect of the invention there is provided a tracking system for tracking content in a mobile communication network, the tracking system comprising a storage configured to maintain predefined identifying information pertaining to content to be tracked, the identifying information being independent of user information associated with the content, and a processing unit configured to intercept a message originated from a user, compare content of said message with said predefined identifying information, and responsive to obtaining at least partial match in said comparing, conclude that said message comprises content to be tracked.

According to a third aspect of the invention there is provided a memory medium comprising computer executable program code adapted to enable an apparatus to perform the method of the first aspect or any related embodiment.

Any foregoing memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

An advantage that may be achieved by some embodiments of various aspects of the invention is that there is no need to maintain persistent mappings between recipients of certain content and the actual content. Another advantage that may be achieved is that the mechanism of various embodiments of the invention may be terminal independent, that is, there is no need to implement specific functionality in terminals and the tracking system does not necessarily need to be aware of capabilities of the terminals (the system may have this knowledge for other purposes, though). By being terminal independent, the tracking system may be more resistant to malicious use of the system.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

In many of the following examples the content that is tracked is advertising content, but the embodiments of the invention may be equally applicable to tracking some other content as well. The content that is tracked may be originally received or obtained by the sender of the content by any means. As an example, the content may be received by means of an SMS message and then forwarded in an MMS message, or an already forwarded content may be again forwarded.

The messages, whose contents are tracked, may be for example SMS or MMS messages or some other type of messages that are transferred in mobile communication networks. Typically the messages are peer-to-peer messages.

Figure 1:
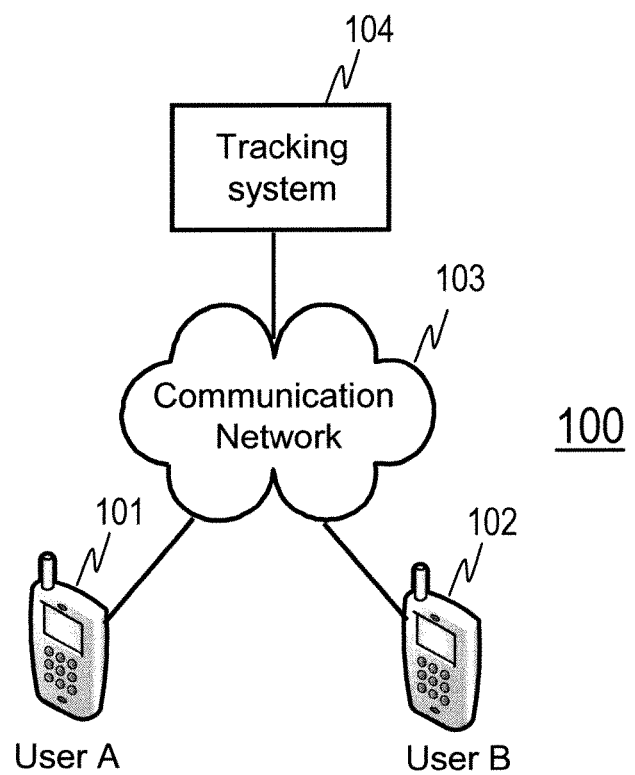
FIG. 1 shows a block diagram of a system according to an embodiment of the invention.

FIG. 1 shows a block diagram of a system according to an embodiment of the invention. The system comprises two end users, user A 101 and user B 102, which are connected to a communication network 103 for example via an air interface offered by base stations and other network elements of the communication network (not shown in the figure). Further the system comprises a tracking system 104, which is connected to the communication network 103 or part of the communication network 103. The tracking system 104 is configured to intercept messages transferred between the end users 101 and 102 and to track, whether the messages comprise forwarded content.

It must be noted that the system of FIG. 1 may, and usually does, comprise various additional components offering different types of functionalities or services needed in the communication network, but those additional components are not shown herein for the sake of simplicity.

Figure 2:
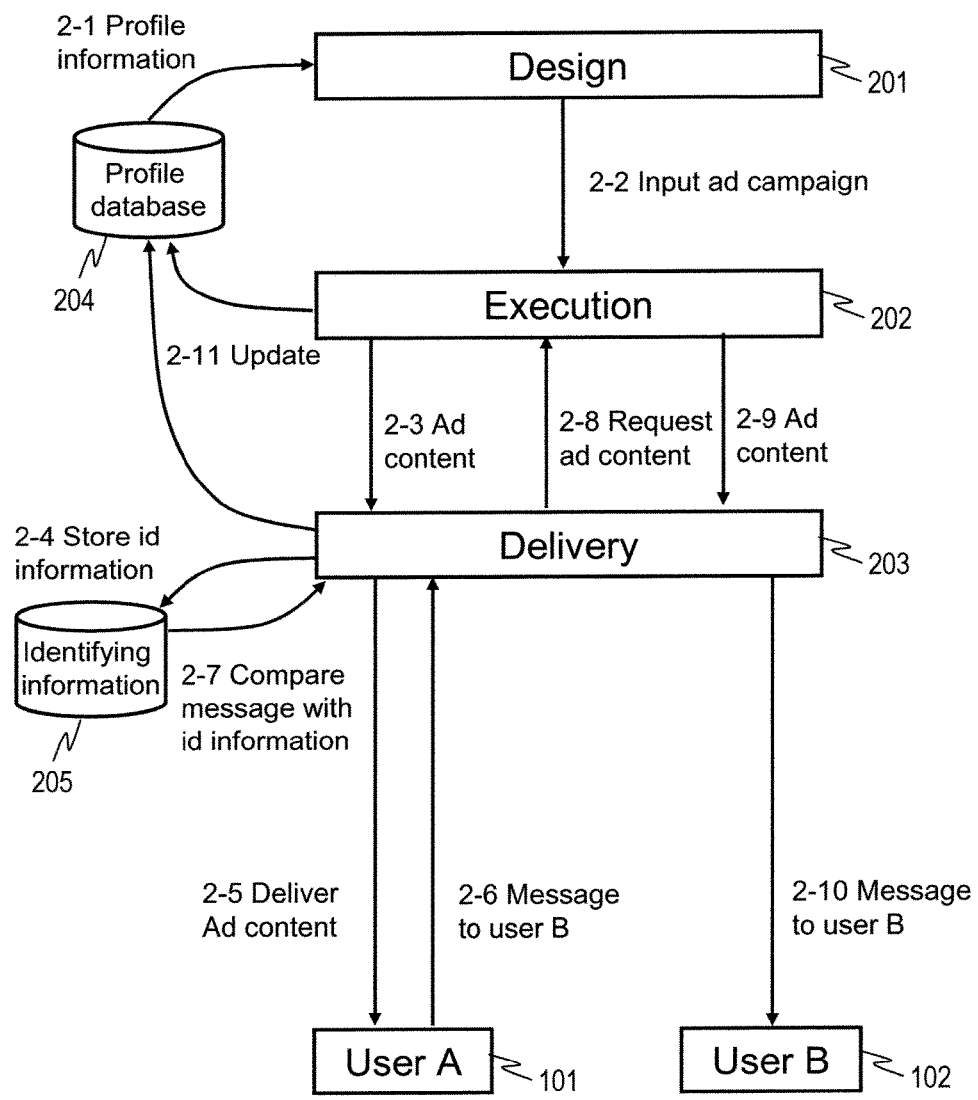
FIG. 2 shows logical components of a system according to an embodiment of the invention.

FIG. 2 shows logical components of a system according to an embodiment of the invention. The system comprises three processing layers: design 201, execution 202, and delivery 203. The processing layers co-operate with a profile database 204 and an identifying information database 205. Further the system comprises two end users: user A 101 and user B 102.

It must be noted that for example the processing layers of FIG. 2 are logical components and that each of them may involve one or more physical components. They may be processes running in the same physical device or in two or more separate physical devices. Also the databases of FIG. 2 may reside in the same physical device with the processing layers or alternatively they may reside in different physical devices.

In an embodiment of the invention the system of FIG. 2 operates as follows.

First an advertising campaign is designed in the design layer 201. For finding suitable target group for the campaign, profile information 2-1 is pulled from the profile database 204. Then the advertising campaign 2-2 is input to the execution layer. The execution layer may for example instantiate the advertising campaign, reserve delivery resources and map the campaign to individual users (e.g. based on their segmentation parameters). The campaign (consisting of the target group (segment) and the individual advertisement(s) of the campaign) is then ready for delivery.

The execution layer provides advertising content 2-3 to the delivery layer. The delivery layer stores identifying information 2-4 pertaining to the advertising content in the identifying information database 205 and then delivers the advertising content 2-5 to user A for example in an SMS or MMS message. The advertising content may be attached into some peer-to-peer message that is on its way to the user A, or a dedicated message originating from the advertising campaign may be used for delivering the advertising content. The advertising content may be delivered to more than one user although only one recipient is shown. However, only one piece of identifying information needs to be stored for one piece of advertising content. It must be noted though that there may be a plurality of variants of the content relating to the same advertising campaign. As an example one variant may be text only, while another one may contain pictures and still another one may contain audio and/or video. Different variants may then be selected to be delivered to different users depending on their network connection, device capabilities or some other parameters. In such case separate identifying information is typically stored for each variant of the content. Different types of identifying information that may be used are discussed in more detail further below.

Let's then assume that the user A forwards the advertising content it received to the user B in a message 2-6. The delivery layer intercepts this message and compares 2-7 the message content to the identifying information stored in the identifying information database. If there is a match (a partial match may suffice), it is concluded that the message comprises forwarded content.

In an embodiment of the invention, the delivery layer is part of or integrated to functionality that provides transfer of messages, which is typically a messaging center such as SMSC or MMSC, and the delivery layer intercepts and examines all messages that are transmitted through the message transfer functionality. Alternatively the delivery layer may intercept and examine only messages that fulfill some predefined criteria. Additionally or alternatively, messages may be intercepted also in case the messaging protocol that is used supports separate forward operation. For example if user A forwards certain MMS message to user B without editing the message, the terminal of the user A may use a "MM1_Forward.REQ" operation defined in 3GPP TS 23.140 V6.9.0, in which only identifier of the message is actually forwarded from user A to user B and the content is delivered to user B from the messaging system on the basis of the forwarded identifier. In this case the intercepting may happen between the messaging center and the user. Still another possibility is to have the intercepting functionality integrated directly to the network without any messaging center. An example of such integrated intercepting functionality is SMS interception on SS7 (Signaling System #7) telecom signaling level.

Now, if it is concluded that the message does not comprise forwarded (advertising) content, the delivery layer proceeds with its "normal" operating instructions and for example requests 2-8 advertising content from the execution layer or performs any other operations as instructed. The execution layer responds with suitable advertising content 2-9 and the delivery layer attaches the advertising content to the message and forwards the message 2-9 to the user B.

If it is concluded that the message does comprise forwarded (advertising) content, it depends on the implementation how such message is handled. One option is that the message is forwarded to the user B as such, without any modification or additional content pertaining to any advertising campaign. Another option is that any advertising content that is attached to the message before forwarding to the user B is adapted to the forwarded advertising content. This means that the advertising content that is attached to the message is selected so that it suits the forwarded advertising content. Any suitable method can be used for finding a suitable additional advertising content.

Additionally, the execution and delivery layers may update 2-11 the profile database 204 in various phases of the procedure. For example, if certain advertising content is forwarded to a certain user, profile information pertaining to that particular user may be updated to reflect interest in that advertisement or other similar advertisements and/or the recipient may be scheduled as target for automatic advertising message for example in case the forwarded advertising content comprised personal information, such as promotion code. Additionally, the information relating to the sender and receiver of the forwarded content can be used as a driver for dynamic user profiling. For example, if a user belonging to a user segment A forwards an advertisement to another user, then this second user can be assumed to be associated with the user segment A with a reasonable probability.

The processing of the messages in FIG. 2 may also comprise some billing activities, e.g. writing respective CDRs (call data record) or performing a prepaid charging transaction. Also some external system may be notified of the forwarding event.

Figure 3:
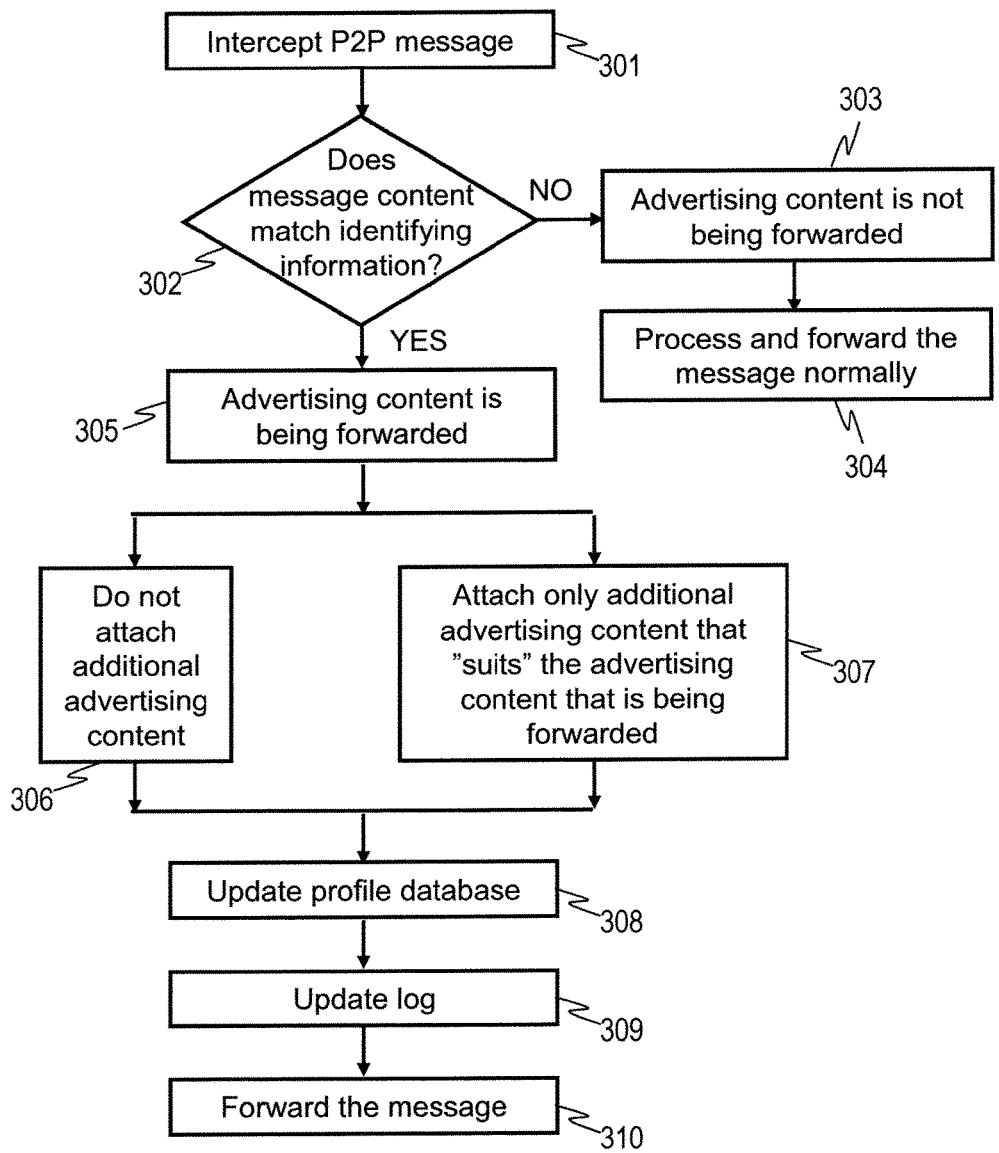
FIG. 3 shows a flow diagram according to an embodiment of the invention.

FIG. 3 shows a flow diagram according to an embodiment of the invention. The method may be used for example in the system of FIG. 1 or 2. In phase 301 a peer-to-peer (P2P) message is intercepted. In phase 302, it is checked, if content of the intercepted message matches identifying information pertaining to advertising content that is to be tracked. If there is no match, it is concluded in phase 303 that advertising content is not being forwarded and the message is processed and forwarded normally in phase 304. What exactly is included in normal processing depends on the implementation, but it may involve for example attaching advertising content into the message.

If there is a match or a partial match in phase 302, it is concluded in phase 305 that advertising content is being forwarded. This may result is that no additional advertising content is attached into the message in phase 306 or in that only additional advertising content that suits the forwarded advertising content may be attached into the message in phase 307. The latter means that the procedure may for example verify that the two advertisements eventually included in the message are not conflicting or that they do not involve directly competing products.

Then in phase 308 the procedure may proceed to update user profile(s) in a profile database. User information pertaining to the sender and/or receiver of the message may be extracted from the intercepted message and used for identifying the respective user profile. Additionally or alternatively forwarding of the advertising content may be logged in phase 309. The information that is logged does not necessarily need to comprise information about the sender or the receiver of the message, but it is possible to include also that information. This logged information may be used for example for identifying usage patterns or general user response to particular advertising content.

Finally the message that was intercepted is forwarded to its intended recipient in phase 310.

It must be noted that the order of the phases shown in FIG. 3 is not restrictive. Instead, the phases may be conducted in different order and moreover some of the phases may be left out from a certain implementation and some of the phases may be repeated a plurality of times. The same applies to the flow charts of FIGS. 4 and 5 discussed below.

Figure 4:
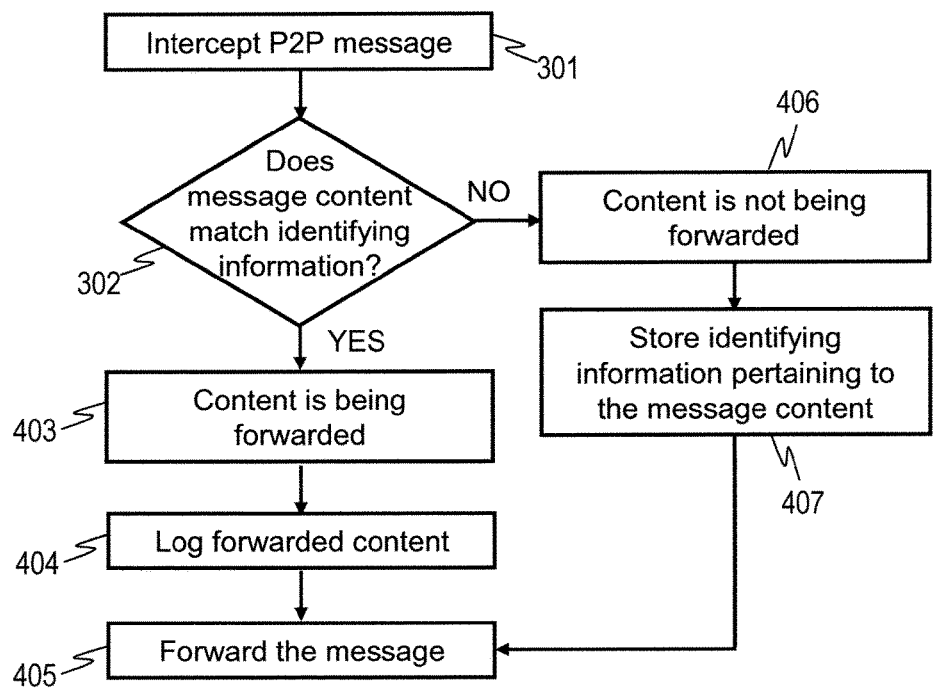
FIG. 4 shows a flow diagram according to another embodiment of the invention.

FIG. 4 shows a flow diagram according to another embodiment of the invention. The method of this embodiment may be used for example for recognizing certain phrases or patterns that are repeatedly used in peer-to-peer communication. Like in FIG. 3, first a peer-to-peer (P2P) message is intercepted in phase 301 and in phase 302, it is checked, if content of the intercepted message matches identifying information pertaining to content that is to be tracked. Also here the content may be advertising content or some other content.

If there is a match or a partial match, it is concluded in phase 403 that content is being forwarded. Then in phase 404, forwarding of the content is logged. Also profile information pertaining to the sender and/or receiver of the message may be updated if desired (not shown in FIG. 4). Then the message is forwarded to its intended recipient in phase 405.

If there is no match in phase 302, it is concluded in phase 406 that content is not being forwarded. After that, identifying information pertaining to the message content is stored in phase 407. In this way the system may later notice if the content of the message is repeatedly used in peer-to-peer communication. Next the procedure proceeds to phase 405 to forward the message to its intended recipient.

Figure 5:
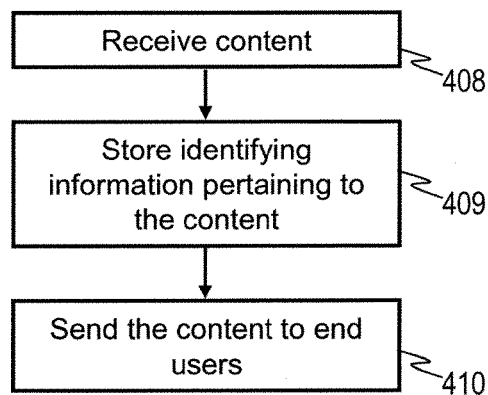
FIG. 5 shows a flow diagram according to still another embodiment of the invention.

FIG. 5 shows a flow diagram according to still another embodiment of the invention. In phase 501 content that is to be tracked is received. The content is destined to certain recipient(s). The content may be received from a higher level application (e.g. advertising content) or the content may be received in a message originating from an end user. In the latter case, the system may be used for example for recognizing certain phrases or patterns that are repeatedly used in peer-to-peer communication.

Then in phase 502 identifying information pertaining to the content is derived and stored. Different types of identifying information are further discussed below. After this, the content is forwarded to the intended recipient(s)/end user(s). The identifying information that is stored is independent of any user information associated with the content, that is, one piece of identifying information per one piece of content is enough irrespective of the number of the recipients of the content. There is no need to store information pertaining to the recipients of the content. That is, there is no need to maintain mapping between MSISDN of the recipient (or the like identifier) and the content sent to respective recipient. In this way one may achieve minimal overhead and storage requirements.

In the following some examples of possible identifying information types and associated mechanisms that may be used for comparing the content (be it advertising content or some other content) with the identifying information are discussed.

If the content that is to be tracked is text only, the whole text is stored as the identifying information in an embodiment of the invention. If the content that is to be tracked comprises one or more pictures (for example in JPG, PNG or GIF format) one may include an identifier in metadata of the picture and then use this identifier as the identifying information according to various embodiments of the invention. If an identifier in some metadata field is not suitable solution also a watermark included in the picture can be used in the same way as an identifier in some metadata field. Additionally or alternatively, a checksum (e.g. MD5) may be calculated for the whole picture and then used as the identifier. Yet another option may be to add an additional transparent layer in the picture and embed the metadata to be used as the identifier in this transparent layer. Any audio or video files included in the content to be tracked may be treated in the same way. If content that includes pictures/audio/video includes text as well, the text can be stored as identifying information as well.

In an embodiment of the invention the full text is not stored as identifying information. Instead some characteristics of the text are stored as identifying information. One may store for example a numbers indicating length of the words of the text. By storing only some characteristics of the content one achieves that any privacy issues can be avoided as the actual content that may be private is not stored.

In an embodiment of the invention the content to be tracked is text, and the text content is stored as identifying information. In that case the comparing of intercepted text content with previously stored identifying information is conducted as follows:
1. Check length of the intercepted text. If it's less than length of identifying information, return failure.
2. If length of the intercepted text is the same as length of identifying information, compute checksum for the intercepted text. If the computed checksum matches checksum of the identifying information, return success, else go to step 3.
3. For each identifying information (that is, for each text in an identifying information database), compute word-levenshtein distance for the intercepted text. If match is found within predefined tolerance, return success, else go to step 4.
4. Return failure.

In an embodiment of the invention the content to be tracked comprises pictures, audio and/or video, and an identifier that is used as the identifying information is stored in some metadata field of the picture/audio/video file. In that case the comparing of intercepted content with previously stored identifying information is conducted as follows:
1. Extract an identifier from metadata comprised in the intercepted content and compare with stored identifying information. If match is found, return success, else go to step 2.
2. If the intercepted content comprises text part, use for example the method discussed above for comparing text, else go to step 3.
3. Return failure.

Herein it must be noted that if the content comprises more than one type of content one may examine all types of content against previously stored identifying information or only one or some of them.

Furthermore, in some embodiments of the invention, a partial match with the previously stored identifying information may suffice. In this way the system may be take into account that the user that forwards some content may make minor modifications or additional notes to the content (or message comprising the content) before forwarding it. For example, if users forward interesting advertisements to friends, they may add in the beginning of the message a note saying "check this" or something similar.

The invention may be implemented by means of a computer program running on a suitable hardware platform or by means of any other suitable combination of hardware, software, special purpose circuits and/or logic.

Figure 6:
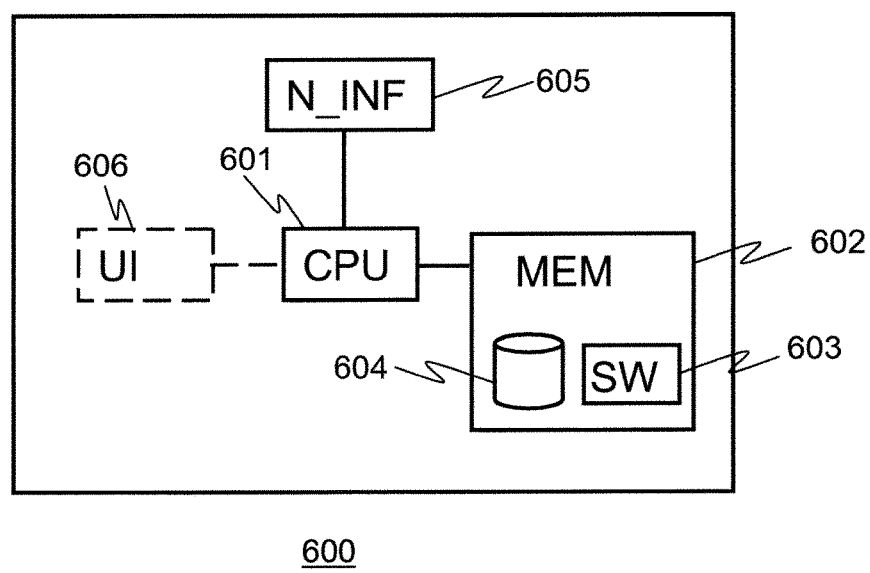
FIG. 6 shows a block diagram of a device suited for implementing various embodiments of the invention.

FIG. 6 shows a block diagram of an apparatus 600 suited for implementing various embodiments of the invention. The apparatus 600 may be a typical computer, such as a general-purpose computer or a server, with possibly distributed functions. The apparatus comprises a processor 601 for controlling the apparatus and a memory 602 including a computer program code or software 603 and a database 604. The processor 601 is typically a central processing unit (CPU) or a master control unit MCU. Alternatively, the processor may be a microprocessor, a digital signal processor, an application specific integrated circuit, a field programmable gate array, a microcontroller or a combination of such elements.

The software 603 includes instructions for the CPU 601 to control the apparatus 600 such as an operating system and different computer applications. The software 603 may comprise instructions for controlling the apparatus to provide some functionality of the invention. The instructions may for example control the apparatus to operate as a tracking system according to some embodiments of the invention. The database 604 includes identifying information used for tracking messages and/or content. As an alternative to being part of the device 600 the database 604 may reside in a physically separate element. In addition to the database 604 the device may comprise separate profile database (not shown) discussed above in connection with various embodiments of the invention.

The apparatus 600 further comprises a network interface unit N_INF 605 such as a LAN (Local Area Network), Ethernet or WLAN (Wireless LAN) unit. The apparatus 600 could also comprise a user interface (not shown), such as a display and a keyboard, but the user interface may be implemented also by means of a remote connection through the network interface unit.

It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method for tracking selected advertising content embedded in messages transmitted in a mobile communication network, the method comprising:

maintaining, in a database, predefined identifying information pertaining to the selected advertising content to be tracked between a first user and one or more receivers, said identifying information being maintained independently of user information associated with the selected advertising content;

delivering the selected advertising content to the first user;

intercepting, at a server having processor and executable computer programming code, a message transmitted over the mobile communication network from the first user to the one or more receivers;

the executable computer programming code adapted for comparing content of said message with said predefined identifying information pertaining to the selected advertising content to be tracked between the first user and the one or more receivers;

if a match is not obtained in said comparing step, the code adapted for concluding that said message does not comprise the selected advertising content to be tracked and attaching additional content to the message before forwarding the message to the one or more receivers;

responsive to obtaining at least partial match in said step of comparing, the code adapted for concluding that said message comprises the selected advertising content to be tracked, forwarding said message to the one or more receivers, and tracking the selected advertising content of said message from the first user to the one or more receivers, said predefined identifying information pertains to at least one characteristic of the selected advertising content to be tracked and said comparison is conducted by comparing characteristics of the content of said intercepted message to said at least one characteristic of the selected advertising content to be tracked, wherein said at least one characteristic of the selected advertising content to be tracked comprises a watermark of the selected advertising content to be tracked, and a checksum, and wherein said comparison uses computation of word-levenshtein distances; and logging user information associated with at least one of the first user and the one or more receivers of the intercepted message in a user profile database in response to obtaining at least partial match of the message content and the predefined identifying information pertaining to the selected advertising content to be tracked.

2. The method according to claim 1, wherein the method further comprises:

distributing advertising content to the one or more recipients;

storing identifying information pertaining to said distributed advertising content; and using said stored identifying information as said predefined identifying information.

3. The method according to claim 1, wherein:

responsive to obtaining at least a partial match in said step of comparing, the code adapted for concluding that said message comprises the selected advertising content to be tracked that was initially delivered to the first user and that is being forwarded by the first user to the one or more receivers.

4. The method according to claim 1, wherein the method further comprises:

responsive to concluding that said message comprises the selected advertising content to be tracked, attaching into said message additional advertising content that suits the selected advertising content to be tracked.

5. The method according to claim 1, further comprising the step of updating profile information pertaining to the one or more of receivers if the selected advertising content is forwarded from the sender to the one or more receivers.

6. The method according to claim 1, further comprising a step of dynamic user profiling.

7. A non-transitory storage medium comprising computer executable program code adapted to enable an apparatus to perform:

maintaining predefined identifying information pertaining to selected advertising content to be tracked between a first user and one or more receivers, the identifying information being stored in a database independently of user information associated with the selected advertising content to be tracked; delivering the advertising content to the first user;

intercepting a message transmitted over a communication network from the first user to the one or more receivers;

comparing content of said intercepted message with said predefined identifying information pertaining to the selected advertising content to be tracked;

if a match is not obtained in said comparing step, concluding that said intercepted message does not comprise the selected advertising content to be tracked and attaching additional content to the message before forwarding the message to the one or more receivers;

responsive to obtaining at least partial match in said step of comparing, concluding that said intercepted message comprises the selected advertising content to be tracked, forwarding said message to the one or more receivers, and tracking the selected advertising content of said message from the first user to the one or more receivers, said predefined identifying information pertains to at least one characteristic of the selected advertising content to be tracked and said comparison is conducted by comparing characteristics of the content of said intercepted message to said at least one characteristic of the selected advertising content to be tracked, wherein said at least one characteristic of the selected advertising content to be tracked comprises a watermark of the selected advertising content to be tracked, and a checksum, and wherein said comparison uses computation of word-levenshtein distances; and logging user information associated with at least one of the sender and receiver of said intercepted message in a user profile database in response to obtaining at least partial match of the message content and the predefined identifying information pertaining to the selected advertising content to be tracked.

8. The non-transitory storage medium according to claim 7, wherein the method further comprises:

distributing the selected advertising content to the one or more recipients;

storing identifying information pertaining to said distributed advertising content; and using said stored identifying information as said predefined identifying information.

9. The non-transitory storage medium according to claim 7, wherein:
responsive to obtaining at least a partial match in said step of comparing, concluding that said intercepted message comprises the selected advertising content to be tracked that was initially delivered to the first user and that is being forwarded by the first user to the one or more receivers.

10. The non-transitory storage medium according to claim 7, wherein the method further comprises:
responsive to concluding that said intercepted message comprises the selected advertising content to be tracked, attaching into said intercepted message additional advertising content that suits the selected advertising content to be tracked; and
forwarding said intercepted message with the additional advertising content.

\* \* \* \* \*